United States Patent
Hong et al.

(10) Patent No.: US 9,755,271 B2
(45) Date of Patent: Sep. 5, 2017

(54) CELL AND PREPARATION METHOD THEREOF

(71) Applicant: Ningde Amperex Technology Limited, Ningde (CN)

(72) Inventors: Xiang Hong, Ningde (CN); Jiewei Zhang, Ningde (CN); Kaifu Zhong, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 118 days.

(21) Appl. No.: 14/728,607

(22) Filed: Jun. 2, 2015

(65) Prior Publication Data

US 2015/0357672 A1    Dec. 10, 2015

(30) Foreign Application Priority Data

Jun. 9, 2014  (CN) .......................... 2014 1 0251916

(51) Int. Cl.
*H01M 10/0562*  (2010.01)
*H01M 10/056*   (2010.01)
(Continued)

(52) U.S. Cl.
CPC ....... *H01M 10/056* (2013.01); *H01M 10/052* (2013.01); *H01M 10/058* (2013.01);
(Continued)

(58) Field of Classification Search
CPC ...................... H01M 10/0562; H01M 10/0525
See application file for complete search history.

(56) References Cited

U.S. PATENT DOCUMENTS 5,238,759 A    8/1993  Plichta et al.
5,981,097 A *  11/1999 Rajendran ................ B32B 7/02
                                                   204/296
(Continued)

FOREIGN PATENT DOCUMENTS

CN        1242112 A    1/2000
CN        1156925 C    7/2004
(Continued)

*Primary Examiner* — Olatunji Godo
(74) *Attorney, Agent, or Firm* — Morgan, Lewis & Bockius LLP

(57) ABSTRACT

The present disclosure provides a cell and a preparation method thereof. The cell comprises a positive electrode plate (1); a negative electrode plate (2) and a composite solid electrolyte membrane (3) positioned between the positive electrode plate (1) and the negative electrode plate (2). The composite solid electrolyte membrane (3) comprises inorganic solid electrolyte layers (31) and structure supporting layers (32) which are alternately laminated along a laminating direction (D), and has abutted surfaces (S1) respectively abutting against the positive electrode plate (1) and the negative electrode plate (2), an angle between the laminating direction (D) and the abutted surface (S1) is defined as α, and 0°≤α<90°. The composite solid electrolyte membrane not only plays an advantage of a high lithium ionic conductivity of the inorganic solid electrolyte, but also has an excellent mechanical processing property, thereby significantly improving electrochemical performance and safety performance of the cell.

9 Claims, 5 Drawing Sheets

(51) Int. Cl.
*H01M 10/058* (2010.01)
*H01M 10/052* (2010.01)
*H01M 10/0565* (2010.01)

(52) U.S. Cl.
CPC ... *H01M 10/0562* (2013.01); *H01M 10/0565* (2013.01); *H01M 2300/0068* (2013.01); *H01M 2300/0082* (2013.01); *Y10T 29/49114* (2015.01)

(56) References Cited

U.S. PATENT DOCUMENTS

| | | | | |
|---|---|---|---|---|
| 2009/0068563 | A1* | 3/2009 | Kanda | H01M 4/13 429/306 |
| 2011/0008713 | A1* | 1/2011 | Markoski | H01M 2/14 429/514 |
| 2011/0081580 | A1 | 4/2011 | Stadler et al. | |

FOREIGN PATENT DOCUMENTS

| | | |
|---|---|---|
| CN | 100381487 C | 4/2008 |
| CN | 101325094 A | 12/2008 |
| CN | 101388470 A | 3/2009 |
| CN | 101567433 A | 10/2009 |
| CN | 101273487 B | 4/2010 |
| JP | H0652895 A | 2/1994 |
| JP | 2008103258 A | 5/2008 |
| JP | 2009238576 A | 10/2009 |
| WO | WO-2007075867 A2 | 7/2007 |

\* cited by examiner

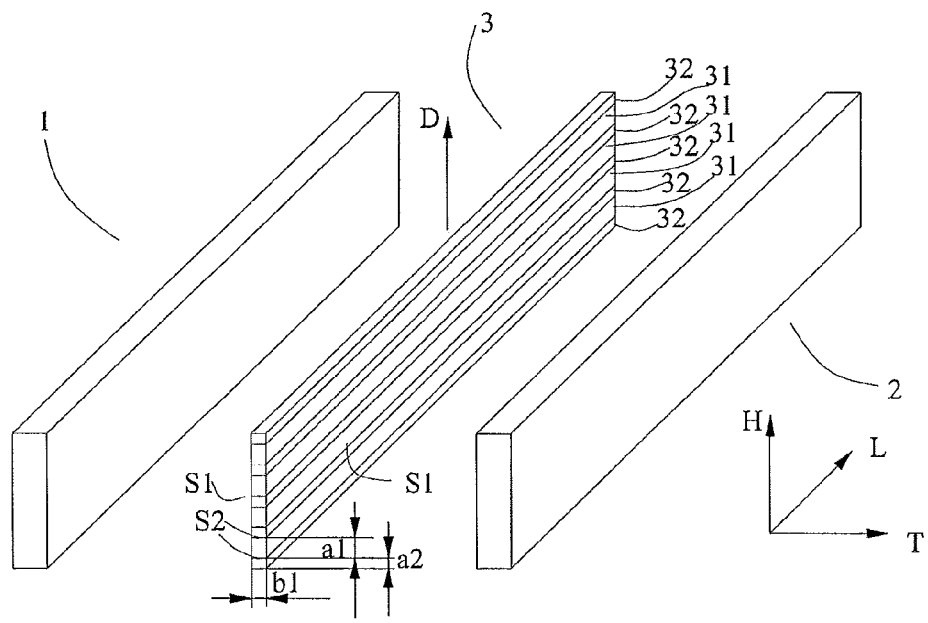
FIG. 1
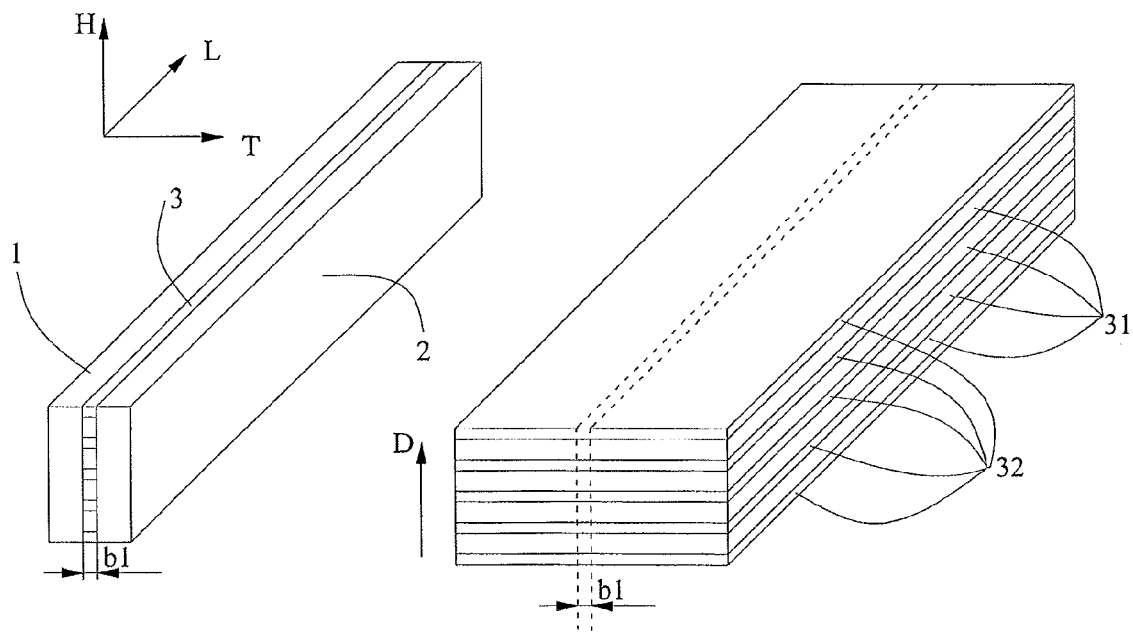
FIG. 2
FIG. 3

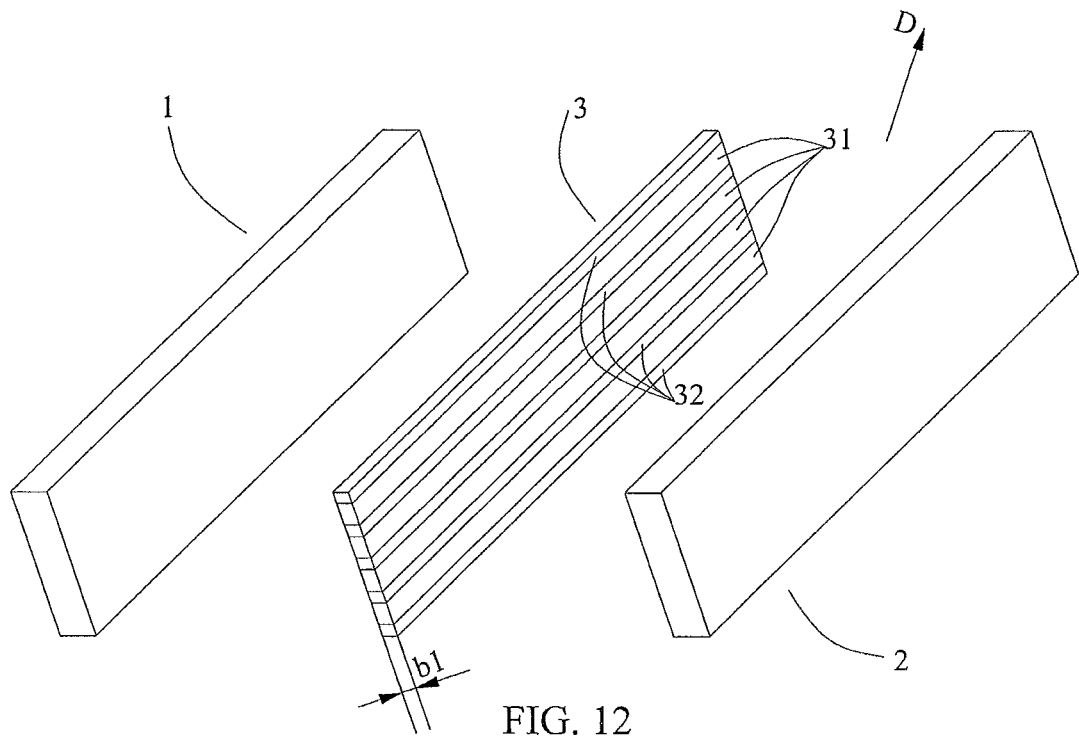
FIG. 12
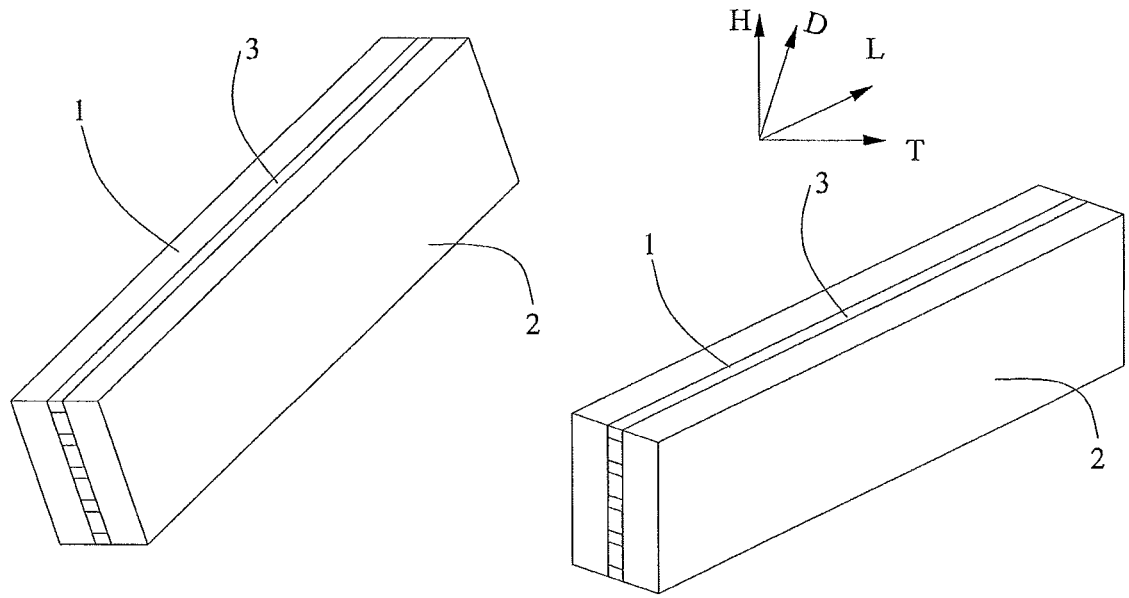
FIG. 13
FIG. 14

CELL AND PREPARATION METHOD THEREOF

CROSS-REFERENCE TO RELATED APPLICATIONS

The present application claims priority to Chinese patent application No. CN201410251916.4, filed on Jun. 9, 2014, which is incorporated herein by reference in its entirety.

FIELD OF THE PRESENT DISCLOSURE

The present disclosure relates to a field of an electrochemical device technology, and more specifically relates to a cell and a preparation method thereof.

BACKGROUND OF THE PRESENT DISCLOSURE

Since the lithium-ion battery has a higher energy density, it has been widely applied in consumer electronics, electric vehicles and energy storage power stations. Conventional lithium-ion battery uses a liquid electrolyte, a higher lithium ionic conductivity of the liquid electrolyte facilitates lithium ions to transmit between a positive electrode plate and a negative electrode plate. However, a non-aqueous organic solvent in the liquid electrolyte is easily volatilized and flamed, which has been a key factor that affects the safety performance of the lithium-ion battery.

In order to resolve the safety problems of the lithium-ion battery, a series of solid electrolytes are developed. These solid electrolytes comprise polymer solid electrolytes and inorganic solid electrolytes. The polymer solid electrolyte has excellent mechanical processability, however, compared with the liquid electrolyte, the lower electrical conductivity of the polymer solid electrolyte at room temperature ($<10^{-4}$ S/cm) makes them greatly restricted in applications of the lithium-ion battery. The recent research discoveries a new sulphur-containing inorganic solid electrolyte, the electrical conductivity of which may even be bigger than the electrical conductivity of the conventional liquid electrolyte, however, because the sulphur-containing inorganic solid electrolyte has a weaker mechanical processing property, it is difficult to be fabricated into a solid electrolyte membrane which can be applied in the lithium-ion battery, and the fragility of the sulphur-containing inorganic solid electrolyte also restricts its applications in the consumer electronics.

United States patent document published as No. US20110081580A1 on Apr. 7, 2011 discloses a method of sintering inorganic solid electrolyte particles under a higher temperature to obtain an inorganic solid electrolyte membrane. However, it is very difficult to obtain an inorganic solid electrolyte membrane with a very small thickness (<0.1 mm) by using this method, therefore it is difficult to be applied in higher energy density lithium-ion battery. Moreover, although the inorganic solid electrolyte membrane prepared with this method has an excellent ability of transmitting lithium ions, due to the fragility of the inorganic solid electrolyte itself, the obtained inorganic solid electrolyte membrane will have a weaker mechanical strength, which is easily fractured to lose the ability of transmitting lithium ions when deformation on the inorganic solid electrolyte membrane occurs.

United States patent document with an issuance publication No. U.S. Pat. No. 5,238,759 issued on Aug. 24, 1993 discloses a method of adding Teflon as an adhesive into an inorganic solid electrolyte, then rolling or extruding the inorganic solid electrolyte to obtain an inorganic solid electrolyte membrane. The inorganic solid electrolyte membrane prepared with this method has an excellent mechanical processing property, however, since Teflon has an isolability for lithium ions and the inorganic solid electrolyte particles in the inorganic solid electrolyte membrane prepared with this method cannot contact well with each other, the lithium ionic conductivity of the obtained inorganic solid electrolyte membrane is relatively small, and the rate performance of the assembled lithium-ion battery is also worse.

SUMMARY OF THE PRESENT DISCLOSURE

In view of the problems existing in the background technology, an object of the present disclosure is to provide a cell and a preparation method thereof, the composite solid electrolyte membrane of the cell not only plays an advantage of a high lithium ionic conductivity of the inorganic solid electrolyte, but also has an excellent mechanical processing property, thereby significantly improving the electrochemical performance and the safety performance of the cell.

In order to achieve the above object, in a first aspect of the present disclosure, the present disclosure provides a cell, which comprises: a positive electrode plate; a negative electrode plate; and a composite solid electrolyte membrane positioned between the positive electrode plate and the negative electrode plate. The composite solid electrolyte membrane comprises inorganic solid electrolyte layers and structure supporting layers which are alternately laminated along a laminating direction, and has abutted surfaces respectively abutting against the positive electrode plate and the negative electrode plate, an angle between the laminating direction and the abutted surface is defined as α, and $0° \leq \alpha < 90°$.

In a second aspect of the present disclosure, the present disclosure provides a preparation method of a cell, for preparing the cell of the first aspect, comprises steps of: providing a positive electrode plate; providing a negative electrode plate; preparing a composite solid electrolyte membrane: alternately depositing inorganic solid electrolyte layers and structure supporting layers on a substrate along a laminating direction to obtain a composite solid electrolyte material which has an alternately laminated structure, then separating the composite solid electrolyte material and the substrate to obtain a composite solid electrolyte membrane, in which the composite solid electrolyte membrane comprises the inorganic solid electrolyte layers and the structure supporting layers which are alternately laminated along the laminating direction; preparing a cell: positioning the obtained composite solid electrolyte membrane between the positive electrode plate and the negative electrode plate to form a cell by winding and/or laminating, in which the composite solid electrolyte membrane has abutted surfaces respectively abutting against the positive electrode plate and the negative electrode plate, an angle between the laminating direction and the abutted surface is defined as α, and $0° \leq \alpha < 90°$.

The present disclosure has following beneficial effects:

1. The composite solid electrolyte membrane of the cell of the present disclosure comprises alternately laminated inorganic solid electrolyte layers and structure supporting layers, the inorganic solid electrolyte particles in the inorganic solid electrolyte layer keep a well contact with each other, thereby well ensuring the structural integrity of the transmission channel of the lithium ions, therefore the composite solid electrolyte membrane can play an advantage of a high lithium ionic conductivity of the inorganic solid electrolyte.

2. In the composite solid electrolyte membrane of the cell of the present disclosure, due to the existance of the structure supporting layer, the composite solid electrolyte membrane has an excellent mechanical processing property, thereby significantly improving the electrochemical performance and the safety performance of the cell.

3. A very thin and excellent composite solid electrolyte membrane can be obtained from the preparation method of the cell of the present disclosure, and the fragility of the inorganic solid electrolyte layer can be overcome in the assembling process and the using process of the cell, therefore the composite solid electrolyte membrane can be well applied in the cell.

4. The laminated structure of the inorganic solid electrolyte layer and the structure supporting layer of the composite solid electrolyte membrane of the present disclosure layer is simple, the cutting operation is easy, therefore the mass production can be easily performed, and it will have great significance on developing a full-solid-state cell with high performance.

BRIEF DESCRIPTION OF THE FIGURES

FIG. 1 is an exploded view illustrating a cell of an embodiment of the present disclosure;

FIG. 2 is an assembled view illustrating the cell of FIG. 1;

FIG. 3 is a schematic view illustrating a forming process of a composite solid electrolyte membrane of the cell in FIG. 1 and FIG. 2;

FIG. 12 is a sectional view illustrating a cell formed from the composite solid electrolyte membrane of FIG. 9 before the upper corner and the lower corner are cut away;

FIG. 13 is an assembled view illustrating the cell of FIG. 12;

FIG. 14 is a schematic view illustrating the cell of FIG. 13 after being rotated.

Figure 4:
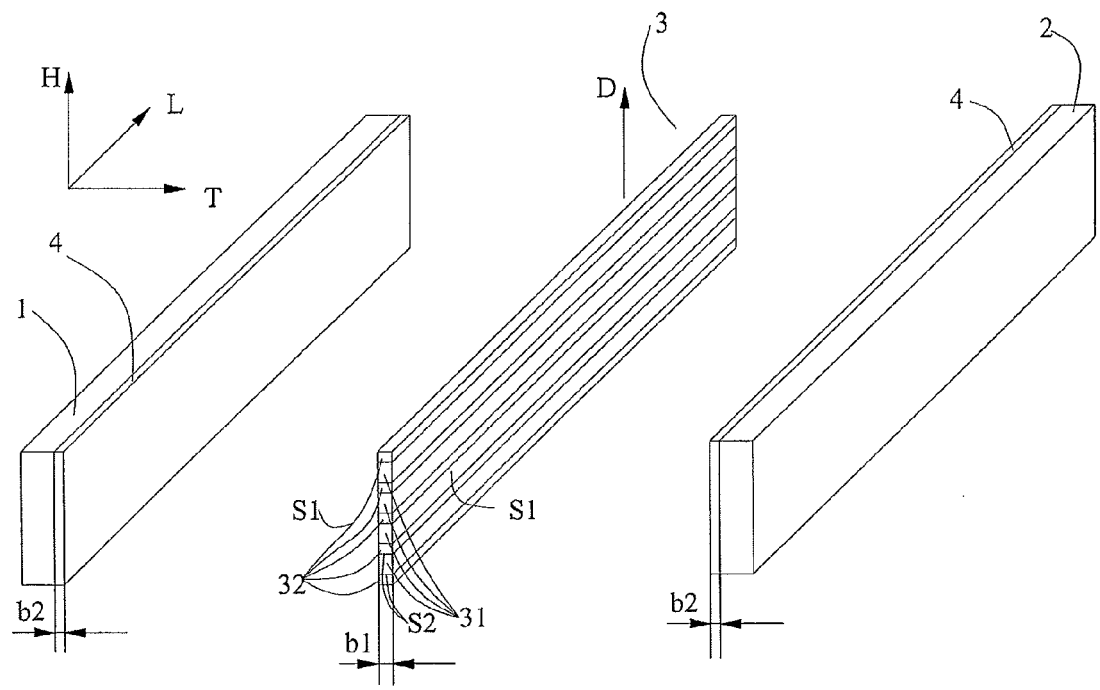
FIG. 4 is an exploded view illustrating a cell of another embodiment of the present disclosure.

REFERENCE NUMERALS OF THE EMBODIMENTS ARE REPRESENTED AS FOLLOWS 1 positive electrode plate
2 negative electrode plate
3 composite solid electrolyte membrane
31 inorganic solid electrolyte layer
32 structure supporting layer
4 buffer layer
D laminating direction
S1 abutted surface
S2 laminated surface
$a_1$ height
$a_2$ height
$b_1$ thickness
$b_2$ thickness
T thickness direction
H height direction
L length direction

DETAILED DESCRIPTION

Hereinafter a cell and a preparation method thereof and examples, comparative examples and test results according to the present disclosure will be described in detail.

Firstly, a cell according to a first aspect of the present disclosure will be described, Referring to FIGS. 1-2, FIGS. 4-7 and FIGS. 12-14, a cell according to a first aspect of the present disclosure comprises: a positive electrode plate 1; a negative electrode plate 2; and a composite solid electrolyte membrane 3 positioned between the positive electrode plate 1 and the negative electrode plate 2. The composite solid electrolyte membrane 3 comprises inorganic solid electrolyte layers 31 and structure supporting layers 32 which are alternately laminated along a laminating direction D, and has abutted surfaces S1 respectively abutting against the positive electrode plate 1 and the negative electrode plate 2, an angle between the laminating direction D and the abutted surface S1 is defined as α, and 0°≤α<90°. In FIGS. 1-2 and FIGS. 4-5, since the laminating direction D is parallel to the abutted surface S1, the angle α is not illustrated.

In the cell according to the first aspect of the present disclosure, the composite solid electrolyte membrane 3 may have an ability of transmitting lithium ions or sodium ions.

In the cell according to the first aspect of the present disclosure, referring to FIG. 1, FIG. 4, FIG. 6 and FIG. 12, the laminated surfaces S2 between the alternately laminated inorganic solid electrolyte layers 31 and the structure supporting layers 32 may be parallel to each other.

In the cell according to the first aspect of the present disclosure, referring to FIGS. 1-2, and FIGS. 4-5, α may be 0°.

In the cell according to the first aspect of the present disclosure, the inorganic solid electrolyte in the inorganic solid electrolyte layer 31 may be at least one selected from a group consisting of lithium-containing oxide with perovskite structure, lithium-containing metal phosphate with Nasicon structure, lithium-containing metal oxide with garnet structure, glassy or ceramic lithium-ion conductor and lithium-containing sulfide with Thio-Lisicon structure.

In the cell according to the first aspect of the present disclosure, the lithium-containing oxide with perovskite structure may be selected from $La_{0.55}Li_{0.35}TiO_3$; the lithium-containing metal phosphate with Nasicon structure may be selected from $LiTi_2(PO_4)_3$—$AlPO_4$; the lithium-containing metal oxide with garnet structure may be selected from $Li_6BaLa_2Ta_2O_{12}$; the glassy or ceramic lithium-ion conductor may be selected from $Li_3N$; the lithium-containing sulfide with Thio-Lisicon structure may be selected from $Li_2S(75\%)$-$P_2S_5(25\%)$ or $Li_{3.25}Ge_{0.25}P_{0.75}S_4$.

In the cell according to the first aspect of the present disclosure, referring to FIG. 1, FIG. 4, FIG. 6 and FIG. 12, a height $a_1$ of each layer of the inorganic solid electrolyte layers 31 along the laminating direction D may be 0.1 μm~100 μm.

In the cell according to the first aspect of the present disclosure, the structure supporting layer 32 may be a polymer layer.

In the cell according to the first aspect of the present disclosure, when the structure supporting layer 32 is the polymer layer, a polymer in the polymer layer may be at least one selected from a group consisting of vinylidene fluoride-hexafluoropropylene copolymer (PVDF-HFP), polyacrylonitrile (PAN), polymethyl methacrylate (PMMA), polyethylene oxide (PEO), polyimide (PI), polyethylene (PE), polypropylene (PP), polytetrafluoroethene (PTFE) and ethylene-propylene-diene terpolymer (EDPM).

In the cell according to the first aspect of the present disclosure, when the structure supporting layer 32 is the polymer layer, a weight-average molecular weight of the polymer in the structure supporting layer 32 may be 50,000~10,000,000.

In the cell according to the first aspect of the present disclosure, the structure supporting layer 32 may also be a polymer electrolyte layer.

In the cell according to the first aspect of the present disclosure, when the structure supporting layer 32 is the polymer electrolyte layer, a polymer electrolyte in the polymer electrolyte layer may comprise a polymer and a lithium salt.

In the cell according to the first aspect of the present disclosure, when the structure supporting layer 32 is the polymer electrolyte layer, the polymer of the polymer electrolyte may be one selected from a group consisting of polyether, polythioether and polyamine.

In the cell according to the first aspect of the present disclosure, when the structure supporting layer 32 is the polymer electrolyte layer, the polyether may be selected from polyethylene oxide (PEO) or polypropylene oxide (PPO); the polythioether may be selected from polyethyl sulfide (PES) or polyphenylene sulfide (PPS); the polyamine may be selected from polyethylene diamine (PEA).

In the cell according to the first aspect of the present disclosure, when the structure supporting layer 32 is the polymer electrolyte layer, the lithium salt of the polymer electrolyte may be at least one selected from a group consisting of lithium hexafluorophosphate (LiPF$_6$), lithium tetrafluoroborate (LiBF$_4$), lithium chloride (LiCl), lithium aluminum tetrachloride (LiAlCl$_4$), lithium trifluoromethane sulfonate (LiCF$_3$SO$_3$), 2,2,2-trifluoro lithium acetate (LiCF$_3$CO$_2$), lithium bis(trifluoromethane)sulfonimide (LiN(CF$_3$SO$_2$)$_2$), lithium hexafluoroarsenate (LiAsF$_6$), lithium bis(fluorosulfony)imide (LiFSI), lithium bis(trifluoromethanesulphonyl)imide (LiTFSI) and lithium bis(oxalate)borate (LiBOB).

In the cell according to the first aspect of the present disclosure, when the structure supporting layer 32 is the polymer electrolyte layer, the weight-average molecular weight of the polymer in the structure supporting layer 32 may be 50,000~10,000,000.

In the cell according to the first aspect of the present disclosure, referring to FIG. 1, FIG. 4, FIG. 6 and FIG. 12, a height $a_2$ of each layer of the structure supporting layers 32 along the laminating direction D may be 0.01 μm~100 μm.

In the cell according to the first aspect of the present disclosure, a ratio between the height $a_1$ of each layer of the inorganic solid electrolyte layers 31 along the laminating direction D and the height $a_2$ of each layer of the structure supporting layers 32 along the laminating direction D, that is $a_1/a_2$, may meet $1 \leq a_1/a_2 \leq 100$, preferably may meet $10 \leq a_1/a_2 \leq 100$.

In the cell according to the first aspect of the present disclosure, referring to FIG. 1, FIG. 4, FIG. 6 and FIG. 12, the first layer and the last layer of the composite solid electrolyte membrane 3 each may be the structure supporting layer 32, a height $a_2$ of the structure supporting layer 32 at the first layer and a height $a_2$ of the structure supporting layer 32 at the last layer along the laminating direction D each may be bigger than a height $a_2$ of each of the other layers of the structure supporting layer 32 along the laminating direction D, the height $a_2$ of the structure supporting layer 32 at the first layer and the height $a_2$ of the structure supporting layer 32 at the last layer along the laminating direction D each may be 0.1 μm~100 μm, so as to separate the obtained composite solid electrolyte material and the used substrate, and facilitate the preparation of the following composite solid electrolyte membrane 3.

In the cell according to the first aspect of the present disclosure, a thickness $b_1$ of the composite solid electrolyte membrane 3 (along a direction perpendicular to the direction of the abutted surface S1) may be 1 μm~100 μm, preferably may be 5 μm~30 μm. If the thickness $b_1$ of the composite solid electrolyte membrane 3 is too large, the energy density of the cell prepared from the composite solid electrolyte membrane 3 will be seriously affected; if the thickness $b_1$ of the composite solid electrolyte membrane 3 is too small, the mechanical processing property of the cell will be affected because the mechanical strength of the composite solid electrolyte membrane 3 is too weak.

Figure 5:
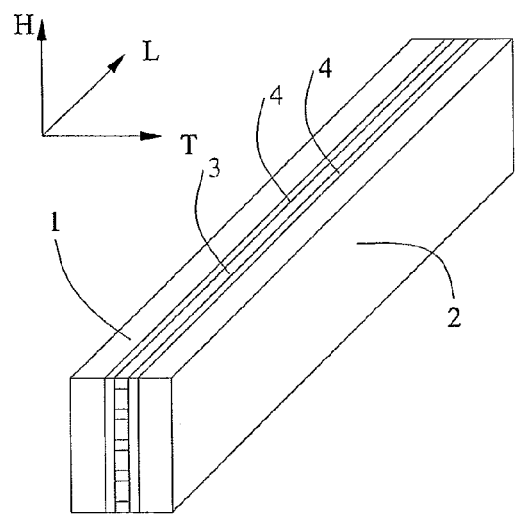
FIG. 5 is an assembled view illustrating the cell of FIG. 4.
Figure 6:
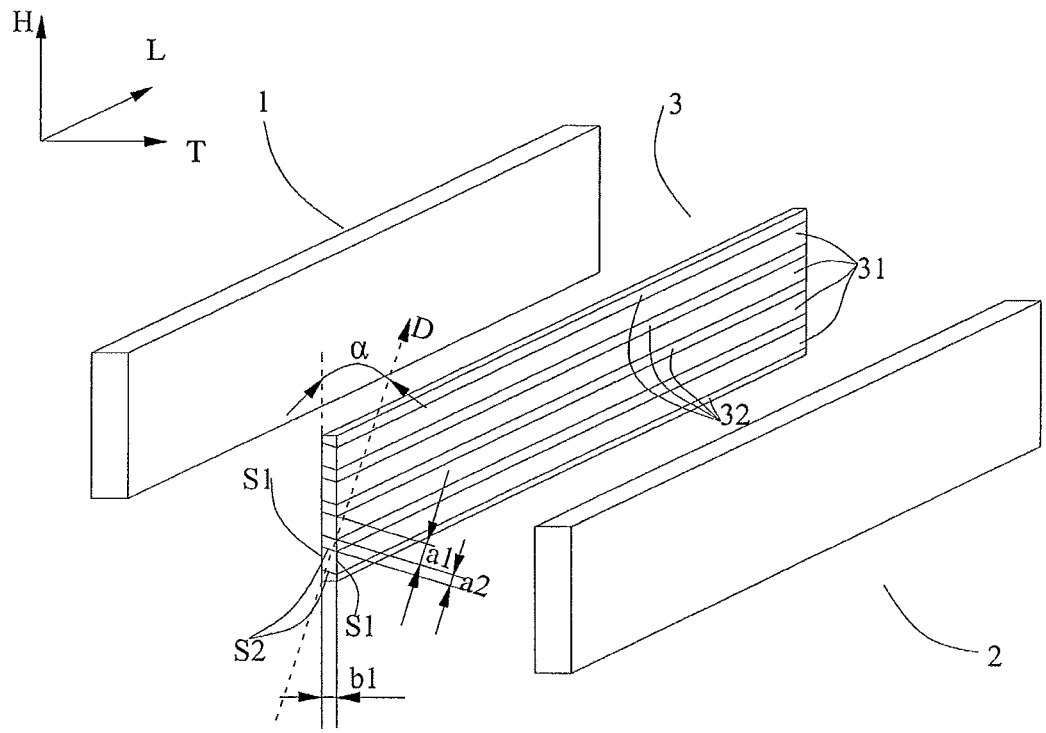
FIG. 6 is an exploded view illustrating a cell of another embodiment of the present disclosure.
Figure 7:
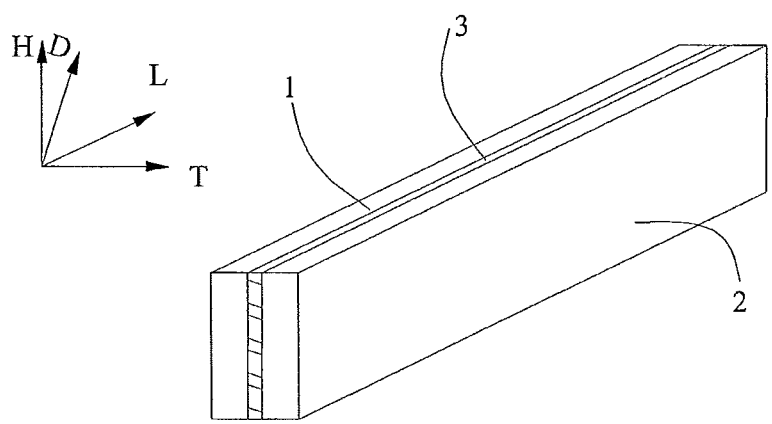
FIG. 7 is an assembled view illustrating the cell of FIG. 6.

In the cell according to the first aspect of the present disclosure, referring to FIGS. 4-5, the cell may further comprise: at lest a buffer layer 4, the buffer layer 4 is positioned between the composite solid electrolyte membrane 3 and the positive electrode plate 1, or the buffer layer 4 is positioned between the composite solid electrolyte membrane 3 and the negative electrode plate 2, or the buffer layers 4 are positioned between the composite solid electrolyte membrane 3 and the positive electrode plate 1 and between the composite solid electrolyte membrane 3 and the negative electrode plate 2. Specifically, the two buffer layers 4 may be positioned respectively between the composite solid electrolyte membrane 3 and the positive electrode plate 1 (in other words, the composite solid electrolyte membrane 3 is abutted against the positive electrode plate 1 via one buffer layer 4, which may be referred as indirect abutting; oppositely, when there is not the buffer layer 4, the composite solid electrolyte membrane 3 and the positive electrode plate 1 are directly abutted) and between the composite solid electrolyte membrane 3 and the negative electrode plate 2 (in other words, the composite solid electrolyte membrane 3 is abutted against the negative electrode plate 2 via another buffer layer 4, which may be referred as indirect abutting; oppositely, when there is not the buffer layer 4, the composite solid electrolyte membrane 3 and the negative electrode plate 2 are directly abutted) (referring to FIGS. 4-5) at the same time, or the buffer layer 4 may be only positioned between the composite solid electrolyte membrane 3 and the positive electrode plate 1, or the buffer layer 4 may be only positioned between the composite solid electrolyte membrane 3 and the negative electrode plate 2.

In the cell according to the first aspect of the present disclosure, a material of the buffer layer 4 may be selected from lithium-containing inorganic salt.

In the cell according to the first aspect of the present disclosure, the lithium-containing inorganic salt may be selected from lithium carbonate, LiF, LiPON or $Li_3N$.

In the cell according to the first aspect of the present disclosure, a thickness $b_2$ of each layer of the buffer layer 4 may be 1 nm~1 μm.

In the cell according to the first aspect of the present disclosure, the cell may be selected from a cell of a lithium-ion battery, a cell of a lithium-ion capacitor, a cell of a sodium-ion battery or a cell of a sodium-ion capacitor.

Next, a preparation method of a cell according to a second aspect of the present disclosure will be described.

Referring to FIGS. 1-14, a preparation method of a cell according to a second aspect of the present disclosure, for preparing the cell according to the first aspect of the present disclosure, comprises steps of: providing a positive electrode plate 1; providing a negative electrode plate 2; preparing a composite solid electrolyte membrane 3: alternately depositing inorganic solid electrolyte layers 31 and structure supporting layers 32 on a substrate (not shown) along a laminating direction D to obtain a composite solid electrolyte material which has an alternately laminated structure, then separating the composite solid electrolyte material and the substrate to obtain a composite solid electrolyte membrane 3, in which the composite solid electrolyte membrane 3 comprises the inorganic solid electrolyte layers 31 and the structure supporting layers 32 which are alternately laminated along the laminating direction D; preparing a cell: positioning the obtained composite solid electrolyte membrane 3 between the positive electrode plate 1 and the negative electrode plate 2 to form a cell by winding and/or laminating, in which the composite solid electrolyte membrane 3 has abutted surfaces S1 respectively abutting against the positive electrode plate 1 and the negative electrode plate 2, an angle between the laminating direction D and the abutted surface S1 is defined as α, and 0°≤α<90°.

In the preparation method of the cell according to the second aspect of the present disclosure, a material of the substrate may be one selected from a group consisting of inorganic non-metallic material, inorganic metallic material and organic polymer.

In the preparation method of the cell according to the second aspect of the present disclosure, the inorganic non-metallic material may be one selected from a group consisting of glass, silicon and graphite; the inorganic metallic material may be one selected from a group consisting of copper, aluminium and iron; the organic polymer may be one selected from a group consisting of polytetrafluoroethene and polyamide. These substrates all have excellent thermal stability and surface flatness, so as to be easily removed after the deposition process is completed.

In the preparation method of the cell according to the second aspect of the present disclosure, the deposition may be physical vapor deposition.

In the preparation method of the cell according to the second aspect of the present disclosure, the physical vapor deposition may be one selected from a group consisting of vacuum evaporating, vacuum ion plating, vacuum magnetron sputtering and vacuum arc plasma plating.

In the preparation method of the cell according to the second aspect of the present disclosure, a vacuum degree when the inorganic solid electrolyte layer 31 is deposited may be $10^{-5}$ Pa~$10^{-2}$ Pa, a temperature when the inorganic solid electrolyte layer 31 is deposited may be 200° C.~500° C.

In the preparation method of the cell according to the second aspect of the present disclosure, when the structure supporting layer 32 is the polymer layer, a vacuum degree upon deposition may be $10^{-4}$ Pa~$10^{-1}$ Pa, a temperature upon deposition may be 100° C.~300° C.

In the preparation method of the cell according to the second aspect of the present disclosure, when the structure supporting layer 32 is the polymer electrolyte layer, a vacuum degree upon deposition may be $10^{-4}$ Pa~$10^{-1}$ Pa, a temperature upon deposition may be 100° C.~300° C.

Figure 8:
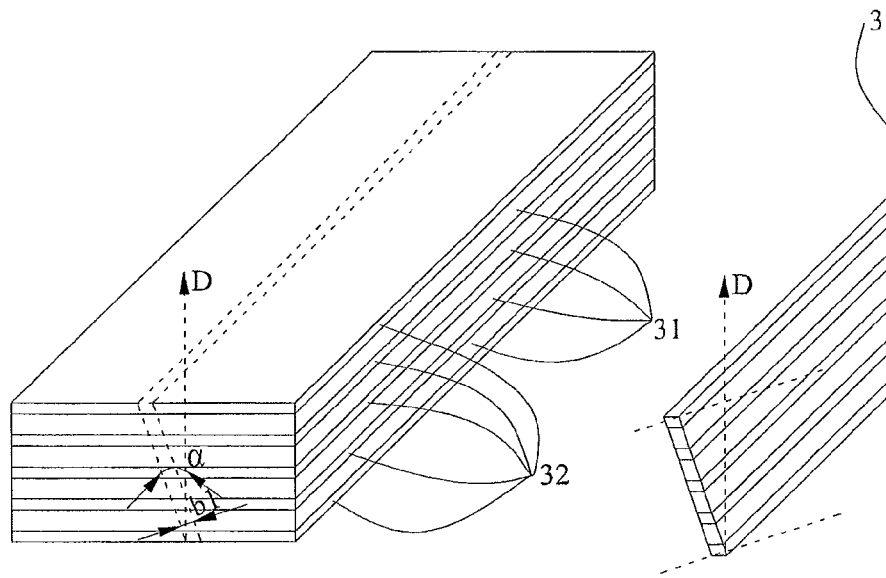
FIG. 8 is a schematic view illustrating a forming process of a composite solid electrolyte membrane of the cell in FIG. 6 and FIG. 7.

In the preparation method of the cell according to the second aspect of the present disclosure, referring to FIG. 3 and FIG. 8, in the step of preparing the composite solid electrolyte membrane 3, before or after the composite solid electrolyte material is separated from the substrate (depending on the practical situation), the composite solid electrolyte material is cut at an angle of α relative to the laminating direction D to form the abutted surfaces S1. In FIG. 3, because a cutting direction (corresponding to the formed abutted surface S1) is parallel to the laminating direction D, the angle α is 0° and is not illustrated, but it is not limited to this. In another method, the composite solid electrolyte membrane 3 may be directly deposited on the substrate without the cutting process and the size of the composite solid electrolyte membrane 3 fully meets the requirement of the cell. However, the operation difficulty of this method is relatively big, the production efficiency is relatively low and the production cost is relatively high. Moreover, as shown in FIGS. 8-11, under the circumstance that the angle α is not 0°, because the composite solid electrolyte membrane 3 is flushed with the positive electrode plate 1 and the negative electrode plate 2 at an upper periphery and a lower periphery, when the positive electrode plate 1 and the negative electrode plate 2 both are rectangular strips, the corners of the structure supporting layers 32, which are respectively positioned at the top and the bottom, of the composite solid electrolyte membrane 3 of FIGS. 8-9 need to be cut away, as shown by an upper dotted line and a lower dotted line in FIG. 9. In another method, under the circumstance that the angle α is not 0°, referring to FIGS. 12-14, adjustment of upper corners and lower corners of the positive electrode plate 1 and the negative electrode plate 2 is needed, however, the corners of the structure supporting layers 32, which are respectively positioned at the top and the bottom, of the composite solid electrolyte membrane 3 are not needed to be cut away, therefore the composite solid electrolyte membrane 3 and the positive electrode plate 1 and the negative electrode plate 2 are flushed with each other at the upper periphery and the lower periphery.

In the preparation method of the cell according to the second aspect of the present disclosure, a cutting method may be one selected from a group consisting of mechanical cutting, laser cutting and plasma cutting.

In the preparation method of the cell according to the second aspect of the present disclosure, the preparation method of the cell according to the second aspect of the present disclosure may further comprises a step before the step of preparing the cell: providing a buffer layer 4 (referring to FIGS. 4-5): a buffer layer 4 is deposited on at least one surface selected from a group consisting of a surface of the positive electrode plate 1 facing the composite solid electrolyte membrane 3, a surface of the negative electrode plate 2 facing the composite solid electrolyte membrane 3, a surface of the composite solid electrolyte membrane 3 facing the positive electrode plate 1 and a surface of the composite solid electrolyte membrane 3 facing the negative electrode plate 2, to make the buffer layer 4 positioned between the composite solid electrolyte membrane 3 and the positive electrode plate 1, or to make the buffer layer 4 positioned between the composite solid electrolyte membrane 3 and the negative electrode plate 2, or to make the buffer layers 4 positioned between the composite solid electrolyte membrane 3 and the positive electrode plate 1 and between the composite solid electrolyte membrane 3 and the negative electrode plate 2. That is the buffer layer 4 may only be positioned between the composite solid electrolyte membrane 3 and the positive electrode plate 1, or the buffer layer 4 may only be positioned between the composite solid electrolyte membrane 3 and the negative electrode plate 2, or the two buffer layers 4 may be positioned respectively between the composite solid electrolyte membrane 3 and the positive electrode plate 1 and between the composite solid electrolyte membrane 3 and negative electrode plate 2 (referring to FIGS. 4-5) at the same time. Referring to FIGS. 4-5, one buffer layer 4 is deposited on the surface of the positive electrode plate 1 facing the composite solid electrolyte membrane 3 and another buffer layer 4 is deposited on the surface of the negative electrode plate 2 facing the composite solid electrolyte membrane 3, therefore the two buffer layers 4 are positioned respectively between the composite solid electrolyte membrane 3 and the positive electrode plate 1 and between the composite solid electrolyte membrane 3 and the negative electrode plate 2 at the same time.

Then examples and comparative examples of the cell and the preparation method thereof according to the present disclosure would be described.

Example 1

(1) Providing a Positive Electrode Plate

Positive active material (lithium cobaltate ($LiCoO_2$)), adhesive (polyvinylidene fluoride (PVDF)) and conductive agent (conductive carbon) according to a mass ratio of 95:3:2 were uniformly mixed with solvent (N-methyl pyrrolidone (NMP)) to form a positive electrode slurry, where a solid content of the positive electrode slurry was 40%, then the positive electrode slurry was uniformly coated on both surfaces of current collector (aluminum foil with a thickness of 12 μm) and was then compacted by a roller machine, which was then followed by cold pressing, cutting, welding a positive tab, and finally a positive electrode plate was obtained.

(2) Providing a Negative Electrode Plate

Negative active material (artificial graphite), thickening agent (carboxymethyl cellulose sodium), conductive agent (conductive carbon) and adhesive (styrene-butadiene lattices) according to a mass ratio of 95:1.5:1.5:2 were uniformly mixed with solvent (denioned water) to form a negative electrode slurry, where a solid content of the negative electrode slurry was 50%, then the negative electrode slurry was uniformly coated on both surfaces of current collector (copper foil with a thickness of 8 μm) and was then compacted by a roller machine, which was then followed by cold pressing, cutting, welding a negative tab, and finally a negative electrode plate was obtained.

(3) Preparing a Composite Solid Electrolyte Membrane

At 150° C. and $1 \times 10^{-3}$ Pa, polytetrafluoroethene (PTFE) with a weight-average molecular weight of 100,000 and a height of 20 μm was deposited on substrate (copper foil) via vacuum magnetron sputtering to function as the first layer; then inorganic solid electrolyte ($Li_{3.25}Ge_{0.25}P_{0.75}S_4$) with a height of 100 μm and PTFE with a height of 1 μm were alternately deposited on the above copper foil, which was deposited with PTFE, via vacuum magnetron sputtering respectively under the condition of 200° C. and $1 \times 10^{-2}$ Pa and under the condition of 150° C. and $1 \times 10^{-3}$ Pa, in which in the alternate deposition process, the layer number of the inorganic solid electrolyte layers 31 was bigger than the layer number of the structure supporting layer 32 by one;

finally at 150° C. and $1 \times 10^{-3}$ Pa, PTFE with a height of 20 μm was deposited via vacuum magnetron sputtering to function as the last layer;

the composite solid electrolyte material having an alternately laminated structure with a whole height of 50 mm was obtained, then the composite solid electrolyte material was separated from the substrate (copper foil), and then 10 μm of the composite solid electrolyte membrane was cut away along a direction parallel to the laminating direction D (that was α was 0°) via laser cutting, that was the composite solid electrolyte membrane with a thickness $b_1$ of 10 μm was obtained.

(4) Preparing a Cell

The composite solid electrolyte membrane was positioned between the positive electrode plate 1 and the negative electrode plate 2, which were then wound together to form a cell.

Example 2

(1) Providing a Positive Electrode Plate
It was the same as that in example 1.
(2) Providing a Negative Electrode Plate
It was the same as that in example 1.
(3) Preparing a Composite Solid Electrolyte Membrane At 120° C. and $1 \times 10^{-2}$ Pa, polymer electrolyte with a height of 1 μm comprising polyethylene oxide (PEO) with a weight-average molecular weight of 600,000 and LiTFSI (a weight ratio of PEO to LiTFSI was 3:1) was deposited on substrate (aluminium foil) via vacuum evaporating to function as the first layer;

then inorganic solid electrolyte ($Li_2S(75\%)$-$P_2S_5(25\%)$) with a height of 1 μm and the above polymer electrolyte with a height of 0.01 μm were alternately deposited on the above aluminium foil, which was deposited with the polymer electrolyte, via vacuum evaporating respectively under the condition of 300° C. and $1 \times 10^{-3}$ Pa and under the condition of 120° C. and $1 \times 10^{-2}$ Pa, in which in the alternating deposition process, the layer number of the inorganic solid electrolyte layers 31 was bigger than the layer number of the structure supporting layers 32 by one;

finally at 120° C. and $1 \times 10^{-2}$ Pa, polymer electrolyte with a height of 1 μm comprising PEO and LiTFSI (a weight ratio of PEO to LiTFSI was 3:1) was deposited via vacuum evaporating to function as the last layer;

the composite solid electrolyte material with a whole height of 120 mm was obtained, then before the composite solid electrolyte material was separated from the substrate (aluminium foil), 18 μm of the composite solid electrolyte membrane was cut away along a direction parallel to the laminating direction D (that was α was 0°) via plasma cutting, that was the composite solid electrolyte membrane with a thickness $b_1$ of 18 μm was obtained.

(4) Preparing a Cell

The composite solid electrolyte membrane was positioned between the positive electrode plate 1 and the negative electrode plate 2, which were then wound together to form a cell.

Example 3

(1) Providing a Positive Electrode Plate
It was the same as that in example 1.
(2) Providing a Negative Electrode Plate
It was the same as that in example 1.
(3) Preparing a Composite Solid Electrolyte Membrane At 180° C. and $1 \times 10^{-1}$ Pa, polymethyl methacrylate (PMMA) with a weight-average molecular weight of 450, 000 and a height of 100 μm was deposited on substrate (glass) via vacuum evaporating to function as the first layer;

then inorganic solid electrolyte ($Li_6BaLa_2Ta_2O_{12}$) with a height of 100 μm via vacuum ion plating at 500° C. and $1\times10^{-3}$ Pa and PMMA with a height of 0.1 μm via vacuum evaporating at 180° C. and $1\times10^{-1}$ Pa were alternately deposited on the above glass which was deposited with PMMA, in which in the alternating deposition process, the layer number of the inorganic solid electrolyte layers 31 was bigger than the layer number of the structure supporting layers 32 by one;

finally at 180° C. and $1\times10^{-1}$ Pa, PMMA with a height of 100 μm was deposited via vacuum evaporating to function as the last layer;

the composite solid electrolyte material with a whole height of 80 mm was obtained, then the composite solid electrolyte material was separated from the substrate (glass), and then 30 μm of the composite solid electrolyte membrane was cut away along a direction parallel to the laminating direction D (that was α was 0°) via plasma cutting, that was the composite solid electrolyte membrane with a thickness $b_1$ of 30 μm was obtained.

(4) Preparing a Cell

The composite solid electrolyte membrane was positioned between the positive electrode plate 1 and the negative electrode plate 2, which were then wound together to form a cell.

Example 4

(1) Providing a Positive Electrode Plate

It was the same as that in example 1.

(2) Providing a Negative Electrode Plate

It was the same as that in example 1.

(3) Preparing a Composite Solid Electrolyte Membrane

At 300° C. and $5\times10^{-2}$ Pa, ultra high molecular weigh polyethylene (UHMWPE) with a weight-average molecular weight of Ser. No. 10/000,000 and a height of 100 μm was deposited on substrate (glass) via vacuum evaporating to function as the first layer;

then inorganic solid electrolyte $LiTi_2(PO_4)_3$—$AlPO_4$ with a height of 100 μm and UHMWPE with a height of 10 μm were alternately deposited on the above glass, which was deposited with UHMWPE, via vacuum evaporating respectively under the condition of 450° C. and $1\times10^{-5}$ Pa and under the condition of 300° C. and $5\times10^{-2}$ Pa, in which in the alternating deposition process, the layer number of the inorganic solid electrolyte layers 31 was bigger than the layer number of the structure supporting layers 32 by one;

finally at 300° C. and $5\times10^{-2}$ Pa, UHMWPE with a height of 100 μm was deposited via vacuum evaporating to function as the last layer;

the composite solid electrolyte material with a whole height of 80 mm was obtained, then the composite solid electrolyte material was separated from the substrate (glass), and then 20 μm of the composite solid electrolyte membrane was cut away along a direction parallel to the laminating direction D (that was α was 0°) via mechanical cutting, that was the composite solid electrolyte membrane with a thickness $b_1$ of 20 μm was obtained.

(4) Preparing a Cell

The composite solid electrolyte membrane was positioned between the positive electrode plate 1 and the negative electrode plate 2, which were then wound together to form a cell.

Example 5

(1) Providing a Positive Electrode Plate

It was the same as that in example 1.

(2) Providing a Negative Electrode Plate

It was the same as that in example 1.

(3) Preparing a Composite Solid Electrolyte Membrane

At 150° C. and $2\times10^{-3}$ Pa, vinylidene fluoride-hexafluoropropylene copolymer (PVDF-HFP) with a weight-average molecular weight of 180,000 and a height of 10 μm was deposited on substrate (glass) via vacuum evaporating to function as the first layer;

then inorganic solid electrolyte $Li_3N$ with a height of 20 μm via vacuum arc plasma plating at 350° C. and $5\times10^{-4}$ Pa and PVDF-HFP with a height of 0.5 μm via vacuum evaporating at 150° C. and $2\times10^{-3}$ Pa were alternately deposited on the above glass which is deposited with PVDF-HFP, in which in the alternating deposition process, the layer number of the inorganic solid electrolyte layers 31 was bigger than the layer number of the structure supporting layers 32 by one;

finally at 150° C. and $2\times10^{-3}$ Pa, PVDF-HFP with a height of 10 μm was deposited via vacuum evaporating to function as the last layer;

the composite solid electrolyte material with a whole height of 200 mm was obtained, then the composite solid electrolyte material was separated from the substrate (glass), and then 25 μm of the composite solid electrolyte membrane was cut away along a direction parallel to the laminating direction D (that was α was 0°) via mechanical cutting, that was the composite solid electrolyte membrane with a thickness $b_1$ of 25 μm was obtained.

(4) Preparing a Cell

The composite solid electrolyte membrane was positioned between the positive electrode plate 1 and the negative electrode plate 2, which were then wound together to form a cell.

Example 6

Figure 9:
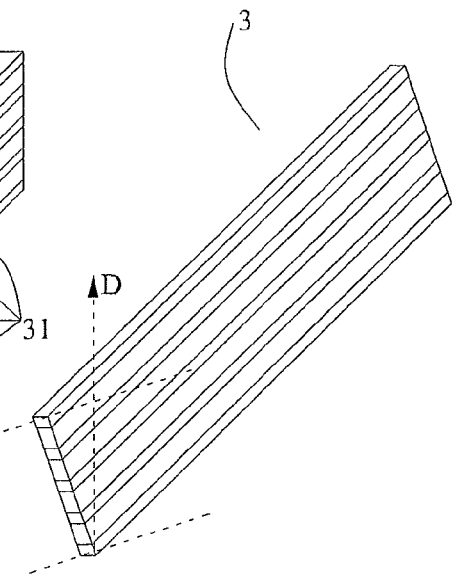
FIG. 9 is a schematic view illustrating the composite solid electrolyte membrane of FIG. 8 before an upper corner and a lower corner are cut away.
Figure 10:
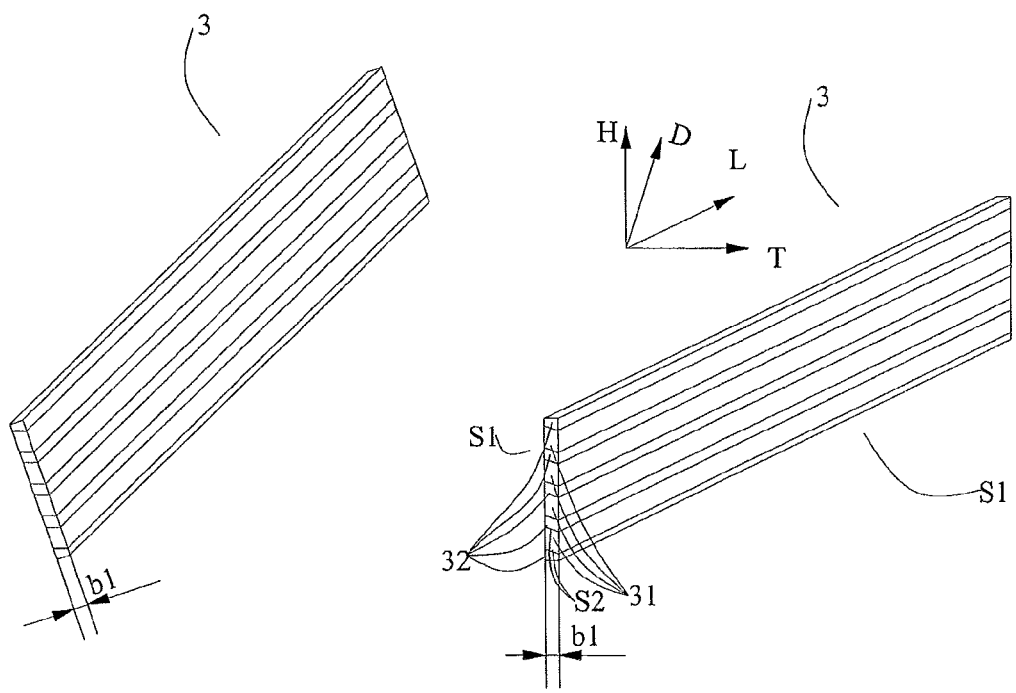
FIG. 10 is a schematic view illustrating the composite solid electrolyte membrane in FIG. 9 after the upper corner and the lower corner are cut away.
Figure 11:
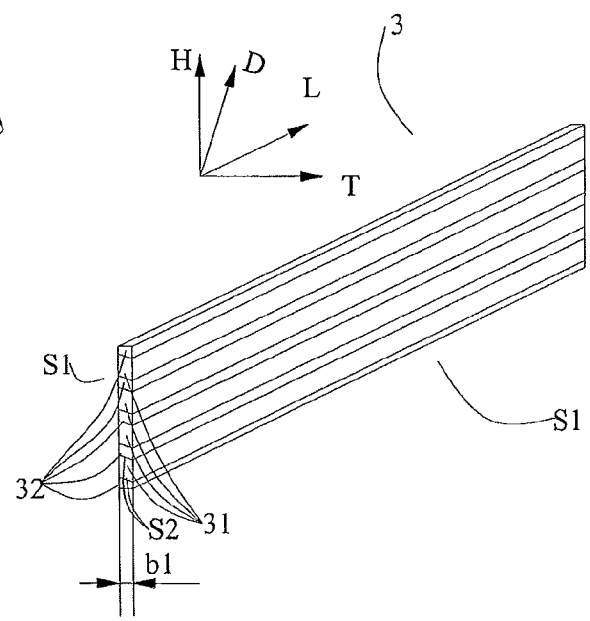
FIG. 11 is a schematic view illustrating the composite solid electrolyte membrane of FIG. 10 after being rotated, the rotated composite solid electrolyte membrane presents a same orientation of FIG. 7.

The cell was prepared the same as that in example 1 except that in the step of preparing a composite solid electrolyte membrane (that was step (3)), after the composite solid electrolyte material was separated from the substrate (copper foil), 14 μm of the composite solid electrolyte membrane was cut away along a direction which was 45° of an angle relative to the laminating direction D (that was α was 45°) via laser cutting, and then the corners of the structure supporting layers 32, which were respectively positioned at the top and the bottom, of the composite solid electrolyte membrane were cut away, as shown by the upper dotted line and the lower dotted line in FIG. 9, that was the composite solid electrolyte membrane with a thickness $b_1$ of 10 μm was obtained.

Example 7

The cell was prepared the same as that in example 1 except that before the step of preparing a cell (that was step (4)), a UPON buffer layer with a thickness $b_2$ of 5 nm was deposited on the surface of the negative electrode plate facing the composite solid electrolyte membrane.

Comparative Example 1

The cell was prepared the same as that in example 1 except that in the step of preparing a composite solid electrolyte membrane (that was step (3)), only the inorganic solid electrolyte was deposited, and a full inorganic solid electrolyte membrane without polytetrafluoroethene layer was obtained.

Comparative Example 2

The cell was prepared the same as that in example 2 except that in the step of preparing a composite solid electrolyte membrane (that was step (3)), only the inorganic solid electrolyte was deposited, and a full inorganic solid electrolyte membrane without the polymer electrolyte layer (the polymer electrolyte comprised polyethylene oxide and LiTFSI) was obtained.

Comparative Example 3

The cell was prepared the same as that in example 3 except that in the step of preparing a composite solid electrolyte membrane (that was step (3)), only the inorganic solid electrolyte was deposited, and a full inorganic solid electrolyte membrane without polymethyl methacrylate layer was obtained.

Comparative Example 4

The cell was prepared the same as that in example 4 except that in the step of preparing a composite solid electrolyte membrane (that was step (3)), only the inorganic solid electrolyte was deposited, and a full inorganic solid electrolyte membrane without ultra high molecular weigh polyethylene layer was obtained.

Comparative Example 5

The cell was prepared the same as that in example 5 except that in the step of preparing a composite solid electrolyte membrane (that was step (3)), only the inorganic solid electrolyte was deposited, and a full inorganic solid electrolyte membrane without vinylidene fluoride-hexafluoropropylene copolymer layer was obtained.

Finally testing processes and test results of examples 1-7 and comparative examples 1-5 would be described.

(1) Testing of the Young Modulus of Solid Electrolyte Membranes

The Young modulus of the composite solid electrolyte membranes of examples 1-7 and the Young modulus of the full inorganic solid electrolyte membranes of comparative examples 1-5 were tested with a Young modulus tester with the method of photo-leverage.

(2) Testing of the Lithium Ionic Conductivity of Symmetric Cells

Two lithium plates each with a thickness of 100 μm and two copper foils each with a thickness of 8 μm were compounded respectively to function as a positive electrode plate and a negative electrode plate respectively (that was one lithium plate and one copper foil were compounded into the positive electrode plate, the other lithium plate and the other copper foil were compounded into the negative electrode plate), the composite solid electrolyte membranes of examples 1-7 and the full inorganic solid electrolyte membranes of comparative examples 1-5 were functioned as the solid electrolyte membrane, then the positive electrode plate, the negative electrode and the solid electrolyte membrane were laminated to form a symmetric cell, EIS testing was conducted under 5 mV and 0.03 Hz-500000 Hz, finally the lithium ionic conductivity of the symmetric cell was calculated.

Table 1 illustrated the test results of examples 1-7 and comparative examples 1-5.

TABLE 1

Test results of examples 1-7 and comparative examples 1-5

|  | Young modulus (Gpa) | lithium ionic conductivity (mS/cm) |
|---|---|---|
| Example 1 | 1.1 | 11.7 |
| Example 2 | 1.7 | 2.5 |
| Example 3 | 12.1 | $4 \times 10^{-2}$ |
| Example 4 | 8.3 | $3 \times 10^{-1}$ |
| Example 5 | 25.6 | $8 \times 10^{-3}$ |
| Example 6 | 1.6 | 10.5 |
| Example 7 | 1.1 | 11.3 |
| Comparative example 1 | 18 | 10.3 |
| Comparative example 2 | 25 | 2.3 |
| Comparative example 3 | 234 | $4 \times 10^{-2}$ |
| Comparative example 4 | 117 | $3 \times 10^{-1}$ |
| Comparative example 5 | 1023 | $7 \times 10^{-3}$ |

It could be seen from a comparison between examples 1-7 and comparative examples 1-5, compared with the full inorganic solid electrolyte membrane, the Young modulus of the composite solid electrolyte membrane of the present disclosure was greatly decreased. It was concluded that, the composite solid electrolyte membrane of the present disclosure effectively improved the elasticity and the mechanical processing property of the inorganic solid electrolyte membrane.

It could also be seen from a comparison between examples 1-7 and comparative examples 1-5, compared with the symmetric cell prepared from the full inorganic solid electrolyte membrane, the lithium ionic conductivity of the symmetric cell prepared from the composite solid electrolyte membrane of the present disclosure didn't show any significant reduction. It was concluded that, the composite solid electrolyte membrane of the present disclosure could ensure the stability of the structure of the inorganic solid electrolyte in the preparation process, thereby ensuring a high lithium ionic conductivity of the symmetric cell using the composite solid electrolyte membrane.

What is claimed is:
1. A cell, comprising:
   a positive electrode plate;
   a negative electrode plate; and
   a composite solid electrolyte membrane positioned between the positive electrode plate and the negative electrode plate, comprising inorganic solid electrolyte layers and structure supporting layers which are alternately laminated along a laminating direction, and having two abutted surfaces respectively abutting against the positive electrode plate and the negative electrode plate, wherein
   there is an angle between the laminating direction and the two abutted surfaces being defined as α, and 0°≤α<90°;
   one of the two abutted surfaces abutting against the positive electrode plate is formed by sides of the inorganic solid electrolyte layers which face the positive electrode plate and sides of the structure supporting layers which face the positive electrode plate;
   the other one of the two abutted surfaces abutting against the negative electrode plate is formed by sides of the inorganic solid electrolyte layers which face the nega- tive electrode plate and sides of the structure supporting layers which face the negative electrode plate; and the laminating direction is extended from one side of the positive electrode plate and the negative electrode plate to the other side of the positive electrode plate and the negative electrode plate.

2. The cell according to claim 1, wherein
a height $a_1$ of each layer of the inorganic solid electrolyte layers along the laminating direction is 0.1 μm~100 μm;
a height $a_2$ of each layer of the structure supporting layers along the laminating direction is 0.01 μm~100 μm; and $1 \leq a_1/a_2 \leq 100$.

3. The cell according to claim 2, wherein $10 \leq a_1/a_2 \leq 100$.

4. The cell according to claim 1, wherein each structure supporting layer is a polymer layer or a polymer electrolyte layer, a polymer electrolyte in the polymer electrolyte layer comprises a polymer and a lithium salt.

5. The cell according to claim 1, wherein the first layer and the last layer of the composite solid electrolyte membrane each are a structure supporting layer, a height $a_2$ of the structure supporting layer at the first layer and a height $a_2$ of the structure supporting layer at the last layer along the laminating direction each are bigger than a height $a_2$ of each of the other layers of the structure supporting layer along the laminating direction, the height $a_2$ of the structure supporting layer at the first layer and the height $a_2$ of the structure supporting layer at the last layer along the laminating direction each are 0.1 μm~100 μm.

6. The cell according to claim 1, wherein a thickness of the composite solid electrolyte membrane is 1 μm~100 μm.

7. The cell according to claim 6, wherein the thickness of the composite solid electrolyte membrane is 5 μm~30 μm.

8. The cell according to claim 1, further comprising:
at least one buffer layer, the buffer layer being positioned between the composite solid electrolyte membrane and the positive electrode plate, or the buffer layer being positioned between the composite solid electrolyte membrane and the negative electrode plate, or the buffer layers being positioned between the composite solid electrolyte membrane and the positive electrode plate and between the composite solid electrolyte membrane and the negative electrode plate.

9. The cell according to claim 8, wherein a material of the buffer layer is selected from a lithium-containing inorganic salt, a thickness of each layer of the buffer layer is 1 nm~1 μm.

* * * * *